United States Patent [19]

Coplin

[11] Patent Number: 4,955,565
[45] Date of Patent: Sep. 11, 1990

[54] LOW DRAG SURFACE

[75] Inventor: John F. Coplin, Derby, England

[73] Assignee: Rolls-Royce plc., London, England

[21] Appl. No.: 662,983

[22] Filed: Sep. 20, 1984

[51] Int. Cl.$^5$ ............................................. B64C 1/38
[52] U.S. Cl. ................................... 244/199; 244/130; 244/207
[58] Field of Search ..................... 244/130, 199, 207; 416/23, 24, 97 R, 97 A, 231 R

[56] References Cited

U.S. PATENT DOCUMENTS

| | | | |
|---|---|---|---|
| 2,716,460 | 8/1955 | Young | 416/24 |
| 3,525,486 | 8/1970 | Wimpenny | 244/130 |
| 3,774,867 | 11/1973 | Quinn | 244/130 |
| 4,039,161 | 8/1977 | Bauer | 244/199 |
| 4,117,995 | 10/1978 | Runge | 244/130 |
| 4,434,957 | 3/1984 | Moritz | 244/130 |

FOREIGN PATENT DOCUMENTS

| | | |
|---|---|---|
| 228637 | 2/1925 | United Kingdom . |
| 415268 | 8/1934 | United Kingdom . |
| 670366 | 4/1952 | United Kingdom . |
| 997943 | 7/1965 | United Kingdom . |

Primary Examiner—Charles T. Jordan
Assistant Examiner—Rochelle Lieberman
Attorney, Agent, or Firm—Cushman, Darby & Cushman

[57] ABSTRACT

A low drag surface comprises at its upstream edge, an intermittent linear vortex producing means which extends transverse to the flow over the surface and produces a succession of rolling vortices extending transverse to said flow. The vortices move across the surface and reduce drag in the manner of roller bearings. In preferred embodiments the vortex producing means is mechanical, in the form of an oscillating part or fluid dynamic, in the form of a nozzle arrangement.

9 Claims, 1 Drawing Sheet

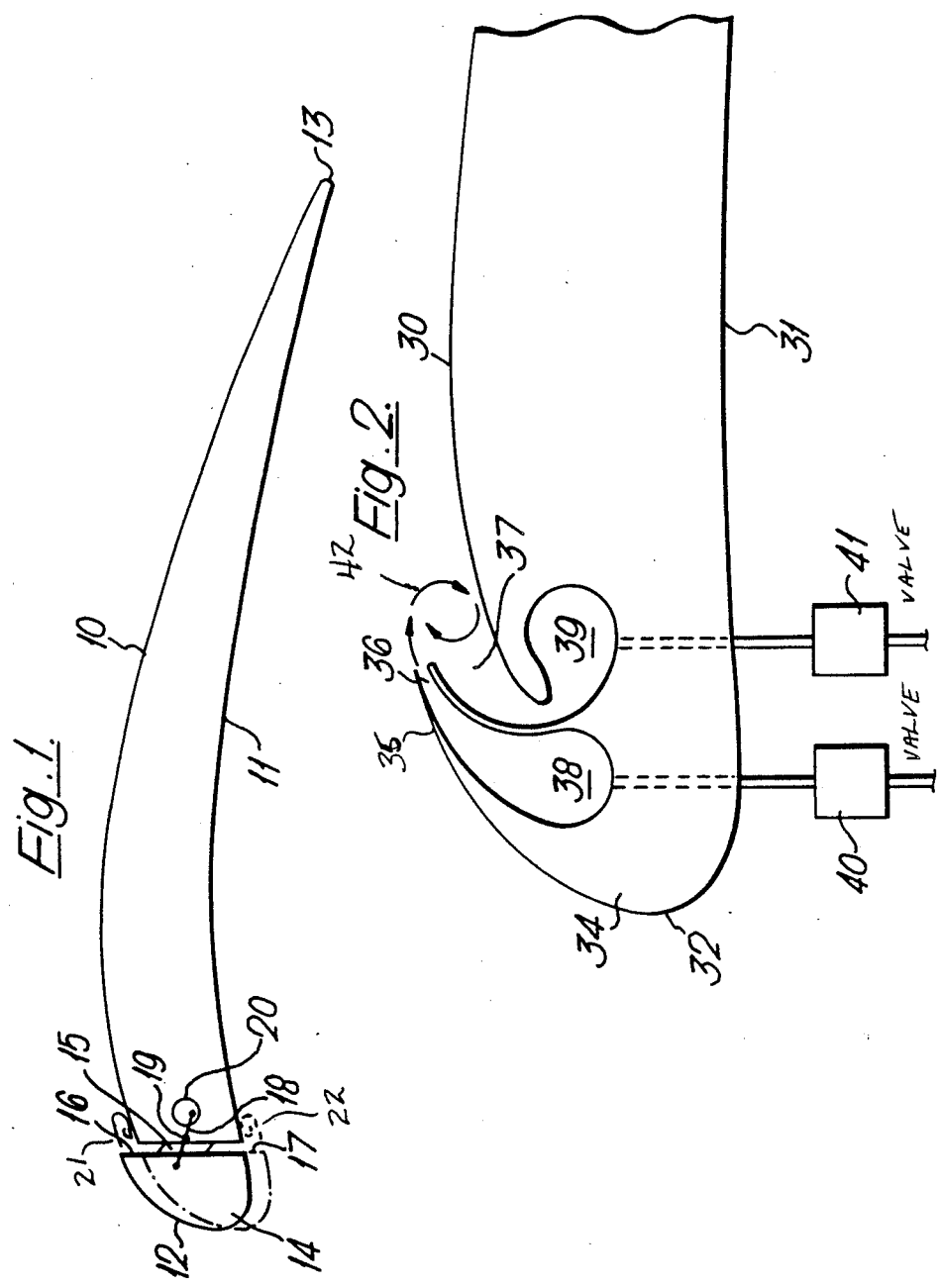

LOW DRAG SURFACE

This invention relates to a low drag surface.

For any surface over which a fluid flows, a drag is set up between the fluid and the surface. This drag is basically caused by the fact that the fluid forms a 'boundary layer' in which its velocity is reduced to a varying degree from that of the remaining flow. To reduce the velocity in this way demands the expenditure of energy, and the energy, which is expended as heat, appears as the drag between the surface and the fluid.

This drag is evidently undesirable, because it represents a waste of energy which reduces the efficiency of the fluid flow device of which the surface is a part. This device may for instance comprise a gas turbine engine, in which case the surface may be that of an aerofoil blade or vane, or it may for instance comprise a ships' propulsion unit in which case the surface could be of the propellor or even of the ships' hull itself.

There have been numerous attempts to reduce this drag, generally by modifying the boundary layer. Thus the boundary layer may be sucked away through pores in the surface, reducing the thickness and thus its drag. Alternatively the boundary layer may be energised by blowing fluid into it in the direction of the fluid flow. These are complex and difficult techniques to perfect, and have not met with general success.

The present invention proposes a form of surface which uses a novel fluid dynamic technique to achieve a low drag.

According to the present invention a low drag surface having a flow of fluid across it comprises, at its upstream edge, an intermittent linear vortex producing means extending transverse to the direction of said flow and producing a succession of rolling vortices extending transverse to the direction of said flow, whereby the rolling vortices thus produced move across said surface to reduce the drag on the surface.

The intermittent linear vortex producing means may comprise a device having two states, in one of which it produces the vortex and in the other of which it frees the vortex to move across the surface with the flow of fluid.

Thus the intermittent linear vortex producing means may comprise a portion of the surface which is moveable with respect to the remainder of the surface to produce a discontinuity which produces the vortex. Alternatively the intermittent linear vortex producing means may comprise nozzle means through which fluid may be ejected to induce the formation of said vortex.

The invention will now be particularly described, merely by way of example, with reference to the accompanying drawings in which:

FIG. 1 is a section through an aerofoil having a surface in accordance with the present invention, and FIG. 2 is a view similar to FIG. 1 but the forward portion of a further embodiment.

FIG. 1 shows an aerofoil having upper and lower surfaces 10 and 11 bounded at their upstream and downstream extremities by leading and trailing edges 12 and 13 respectively. Although drawn in profile, it will be appreciated that the aerofoil will of course have a longitudinal extent determined by its use.

The majority of the aerofoil is of conventional profile; thus the upper and lower surfaces 10 and 11 are of curved profile, the upper surface 10 being convex while the lower surface 11 is concave. The trailing edge 13 is again conventional.

The leading edge region 12 is not, however, conventional. The nose 14 of the aerofoil is formed as a separate piece, held to the remainder of the aerofoil by a resilient connection at 15. The joint between the nose 14 and the remainder of the aerofoil is planar, and the width of the nose 14 at this joint is slightly larger than that of the interfacing surface at the front of the remainder of the aerofoil.

The nose 14 is arranged to have two stable conditions, in one of which (shown in full lines in the drawing) the upper part of the nose projects above the remainder of the upper surface 10 to produce a step or discontinuity 16, while the lower part of the nose forms a smooth interface with the surface 11. In the other stable condition (shown in broken lines) these conditions are reversed in that the upper part of the nose and the surface 10 form a smooth interface while the lower part of the nose projects below the surface 11 to form a step or discontinuity 17.

Actuation means is provided to move the nose 14 between these two stable conditions; in this case a lever 18 is pivoted at 19 and engages at one end with the nose and at the other end eventually with a shaft 20. Rotation of the shaft 20 will cause circular movement of the attached end of the lever 19 and hence will cause the nose 14 to reciprocate between its two stable positions against the restraining influence of the resilient connection 15.

When the nose is in the position shown in full lines, i.e. the upper position, the passage of the fluid flow over the upper surface of the nose across the discontinuity 16 onto the surface 10 will give rise to the formation of a small span-wise vortex shown at 21. Once the upper vortex is formed, the rotation of the shaft 20 is arranged to move the nose 14 downwards, until it reaches the condition shown in broken lines where the interface between the upper surface of the nose and the surface 10 is smooth. Under these conditions the upper vortex 21 is released to roll downstream with the fluid flow passing over the surface 10.

In a similar manner the discontinuity 17 on the under side will form a vortex 22. Once this has been achieved the nose 14 is driven upwards causing the lower vortex 22 to be released and to flow downstream over the lower surface 11.

The cycle is now repeated; a second vortex is formed on the upper surface and so on.

Once running smoothly, it will be seen that there will be a continuous succession of closely spaced vortices rolling over both surfaces 10 and 11 with the stream. The ideal dimensions and frequency of oscillation of the nose piece 14 will clearly vary with different fluids etc, and will need to be determined for each case by experiment or by calculations. However it is intended that the marching vortices will have the effect of 'rollers', reducing drag on the surface and heat transfer between the surface and the air.

The use of the moving nose piece tends to make this embodiment more suitable for larger surfaces such as wings, marine vessels and engine nacelles. It will be noted that the vortices are of the same fluid on the face stream.

A modification of this embodiment would involve the use of a nose piece whose motion is caused by vibration rather than by a positive drive. Again, the principle of this embodiment could be applied to a single surface rather than the upper and lower surfaces illustrated; in this case it might be desirable to use a spring-loaded angled fence as the vortex producing means.

As an alternative to this 'mechanical' method of producing the necessary vortices the same result may be achieved with jets of fluid alternately exercised to form the vortex and then release it. This is illustrated in FIG. 2, where an aerofoil is illustrated having, as in the FIG. 1 embodiment, a conventional trailing portion. Here upper and lower surfaces 30 and 31 extend between leading edge 32 and a trailing edge (not shown), the rear-ward portions of the surfaces and the trailing edge being conventional.

The nose 34 of the aerofoil is modified however to achieve a surface configuration in accordance with the invention. The outer surface of the nose is flared at 35 to produce a discontinuity at its downstream edge between the surface 30 and itself.

This discontinuity provides space for two spanwise extending nozzles 36 and 37, the nozzle 36 being adjacent the edge of the surface 35 while nozzle 37 is below the nozzle 36 and adjacent the surface 30. Nozzle 36 is fed with fluid from a spanwise extending manifold 38 while nozzle 37 is fed from a second spanwise extending manifold 39. The manifold flows are controlled by valves 40 and 41, respectively. Both nozzles point in a rearward direction, substantially parallel with the surface 30.

Because of its location with respect to the surfaces 35 and 30, when fluid is ejected through the nozzle 36 at the proper velocity it forms a vortex 42 in the lee of discontinuity at the edge of the surface 35. To release this vortex, valve 40 is operated to stop flow through the nozzle 36 while valve 41 is opened to cause fluid to flow through nozzle 37. This opens a space between the vortex 42 and the discontinuity and forces the vortex 42 to move with the free stream across the surface.

Repeated phased operation of the valves 40 and 41 and thus of the nozzles 36 and 37 will produce the required succession of linear spanwise extending vortices. As in the previous embodiment these vortices act as roller bearings allowing the fluid to flow with reduced drag and heat transfer.

It will be appreciated that in this instance the fluid forming the vortices may differ from that of the free stream, and this difference may be used to improve the effect of the surface arrangement.

I claim:

1. A low drag surface having a flow of fluid across it and comprising:

an intermittent linear vortex producing means at its upstream edge extending transverse to the direction of said flow and producing a succession of rolling vortices extending transverse to said flow, said intermittent vortex producing means comprises a portion of said surface movable with respect to the remainder of said surface to produce a discontinuity which produces said vortex, said movable surface having two states, one in which it produces the vortex and the other in which it frees the vortex to move with the flow of fluid.

2. A low drag surface as claimed in claim 1 and in which said movable portion provides, in its operative position, a downstream facing step against which said vortex forms.

3. A low drag surface as claimed in claim 1 and in which said moveable portion has an upper and lower surface so that in one position the movable portion defines a step in an upper surface and in the other it forms a step in a lower surface.

4. A low drag surface as claimed in claim 3 and in which said movable portion comprises the leading edge of a aerofoil section.

5. A low drag surface as claimed in claim 1 and comprising actuation means for moving said moveable portion into and out of its operative position.

6. A low drag surface having a flow of fluid across it and comprising:

an intermittent linear vortex producing means at its upstream edge extending transverse to the direction of said flow and producing a succession of rolling vortices extending transverse to said flow, said intermittent linear vortex producing means including nozzle means through which fluid may be ejected to induce the formation of a vortex against a part of said surface, said nozzle means having two states, one for producing the vortex and the other for freeing the vortex to move with said flow of fluid.

7. A low drag surface as claimed in claim 6 and comprising further nozzle means through which fluid may be ejected to cause said vortex to be detached from said part of said surface.

8. A low drag surface as claimed in claim 6 and comprising valve means by which intermittent operation of said nozzle may be effected.

9. A low drag surface as claimed in claim 6 and in which said fluid ejected from said nozzle is the same as that of the free stream.

* * * * *